(12) United States Patent
Virnig et al.

(10) Patent No.: US 6,177,055 B1
(45) Date of Patent: Jan. 23, 2001

(54) PROCESS FOR EXTRACTING AND RECOVERING COPPER

(75) Inventors: Michael J. Virnig; Reuben Grinstein; R. Brantley Sudderth; George Wolfe; Stephen M. Olafson, all of Tucson, AZ (US)

(73) Assignee: Henkel Corporation, Gulph Mills, PA (US)

( * ) Notice: Under 35 U.S.C. 154(b), the term of this patent shall be extended for 0 days.

(21) Appl. No.: 09/389,134

(22) Filed: Sep. 2, 1999

Related U.S. Application Data

(60) Provisional application No. 60/100,322, filed on Sep. 15, 1998, and provisional application No. 60/160,184, filed on Sep. 14, 1998.

(51) Int. Cl.[7] ............................. C22B 15/00; C09K 3/00
(52) U.S. Cl. ............................................. 423/24; 252/184
(58) Field of Search ........................... 423/24, DIG. 14; 252/184; 205/581

(56) References Cited

U.S. PATENT DOCUMENTS

| | | | |
|---|---|---|---|
| 3,224,873 | 12/1965 | Swanson | 75/101 |
| 3,428,449 | 2/1969 | Swanson | 75/117 |
| 3,952,775 | 4/1976 | Ogata | 137/625 |
| 4,020,105 | 4/1977 | Ackerley et al. | 260/566 |
| 4,020,106 | 4/1977 | Ackerley et al. | 260/566 |
| 4,029,704 | 6/1977 | Anderson | 260/566 |
| 4,085,146 | 4/1978 | Beswick | 260/600 |
| 4,173,616 | 11/1979 | Koenders et al. | 423/24 |
| 4,507,268 | 3/1985 | Kordosky et al. | 423/24 |
| 4,544,532 | 10/1985 | Kordosky et al. | 423/24 |
| 4,582,689 | 4/1986 | Kordosky | 423/24 |
| 4,978,788 | 12/1990 | Dalton et al. | 564/265 |
| 5,281,336 | 1/1994 | Dalton et al. | 210/634 |

FOREIGN PATENT DOCUMENTS

| | | |
|---|---|---|
| 1322532 | 7/1973 | (GB) . |
| 1549615 | 8/1979 | (GB) . |

*Primary Examiner*—Steven Bos
(74) *Attorney, Agent, or Firm*—John E. Drach; Patrick J. Span

(57) ABSTRACT

A process for extracting and recovering copper from an aqueous solution containing copper values comprising:

(a) contacting the aqueous copper bearing solution with an organic phase comprising a water insoluble and water immiscible solvent solution of an extraction reagent formulation to extract at least a portion of the copper values into the organic phase;

(b) separating the resultant copper pregnant organic phase from the copper baren aqueous phase; and (c) recovering the copper values from the copper pregnant organic phase;

wherein the extraction reagent formulation comprise an (i) oxime extractant and (ii) an equilibrium modifier in which the modifier is a linear diester or polyester of an unbranched dicarboxylic acid and an unbranched alcohol.

31 Claims, No Drawings

PROCESS FOR EXTRACTING AND RECOVERING COPPER

CROSS REFERENCE TO RELATED APPLICATIONS

This application claims priority from U.S. provisional applications, Serial Number 60/100,184, filed Sep. 14, 1998 and Ser. No. 60/100,322, filed Sep. 15, 1998 the disclosure of each of which are hereby incorporated by reference.

FIELD OF THE INVENTION

This application relates to a process of extracting copper from aqueous solutions containing copper by contacting the aqueous solution with a solution of a water insoluble hydroxy aryl oxime (ketoxime or aldoxime or mixtures thereof) in a water insoluble and water immiscible organic solvent so as to extract the metal from the aqueous solution into the organic phase in the form of a chelate of the metal with the hydroxy aryl oxime and then separating the organic phase loaded with the metal from the aqueous phase by virtue of the immiscibility of the organic phase and the aqueous phase. The metal can then be recovered from the organic phase by stripping with an aqueous acid solution followed, for example, by electrowinning.

The general process of extraction of copper from aqueous solutions such as acid solutions and the recovery of the metal by stripping of the organic phase followed by electrowinning is taught in U.S. Pat. Nos. 4,507,268; 4,544,532; 4,978,788; and 5,281,336 the entire contents of which are hereby incorporated by reference.

The reaction leading to the metal chelate compound also forms acid and causes a lowering of the pH. This reaction is reversible and proceeds to an equilibrium point which will favor formation of the chelate compound as the pH is increased. The metal salt-containing aqueous solutions from which metal e.g. copper is to be extracted will frequently be leach liquors obtained by extracting metal ores with acid and will in some cases have a low pH. Since the amount of chelate compound formed at equilibrium is lower as the pH is decreased only those o-hydroxyaryloximes which have a strong chelating power will be able to achieve a high degree of extraction from those aqueous leach liquors having very low pH or high copper content.

The advantage of high copper extraction shown by these strongly chelating oximes is to some extent offset by the large amount of copper which remains as chelate in the solvent after stripping with acid of convenient strength. While this residual copper as chelate is not lost since it can be recycled to the extraction stage, a reduction in the amount of residual copper chelate would, in the absence of any comparable reduction in the degree of copper extraction from the aqueous solution, afford an improvement in the overall efficiency of the process.

UK Patent No 1549615 teaches that the amount of copper removed in these cases from the solvent phase in the stripping stage is significantly increased if the solvent phase contains a "strip modifier" such as a phenol. This patent also teaches that certain aliphatic alcohols, such as tridecanol have similar beneficial effects.

Strip modifiers will not only influence the strength of the extractant, but can also affect the hydrolytic stability, the selectivity of copper extraction over iron extraction, the level of entrainment, the kinetics of the extraction and stripping stages and the generation of crud. A suitable modifier will therefore often be the result of a compromise.

'Crud' is a term applied to undesirable extraneous matter formed at the organic-aqueous interface or in the organic phase in the settler compartment of mixer settlers used in the solvent extraction process. It is usually an oil-water emulsion stabilized by the presence of finely divided solid material that may be either alumino silicates present in the feed, or colloidal silica precipitated during the solvent extraction operation. It can accumulate in sufficient quantities to seriously reduce the working volume of a settler leading to flooding. Where large quantities are produced it has to be removed and the emulsion broken by centrifuging. Crud can also be a source of loss of reagent.

U.S. Pat. No. 5,281,336 describes the use of highly branched chain aliphatic or aliphatic-aromatic C-10 to C-30 esters or C-14 to C-30 alcohols which give unexpected benefits as strip modifiers. By "highly branched" is indicated as the ratio of the number of methyl carbons to non-methyl carbons is higher than 1:5. Good and unexpected selectivity for copper over iron can be achieved and the above disadvantage concerning crud formation and entrainment level can be overcome by using such compounds, particularly very highly branched derivatives as compared to straight chain compounds.

SUMMARY OF THE INVENTION

The surprising discovery has now been made that copper extractant formulations based on linear diesters perform similarly to formulations based on branched diesters. This is surprising in light of the assertions made in U.S. Pat. No. 4,978,788 and 5,281,336 that linear esters do not perform as well as do highly branched esters in terms of entrainment and crud formation.

Thus, the invention is a process for recovery of copper from an aqueous solution containing copper values comprising the steps of: (1) contacting the aqueous solution with water insoluble extraction reagent composition comprising an aldoxime, a ketoxime or combinations thereof and a diester or polyester of an unbranched monocarboxylic acid or unbranched dicarboxylic acid and an unbranched mono- or diol to extract at least a portion of the copper values into the organic phase; (2) separating the resultant copper pregnant organic phase from the resultant copper barren aqueous phase; and (3) recovering the copper values from the copper pregnant organic phase.

DETAILED DESCRIPTION OF THE INVENTION

Other than in the operating examples, or where otherwise indicated, all numbers expressing quantities of ingredients or reaction conditions used herein are to be understood as modified in all instances by the term "about".

Thus, in its broadest scope, the present invention is directed to a process of recovering copper from an aqueous solution containing copper values comprising:

(a) contacting the aqueous copper bearing solution with an organic phase comprising a water insoluble and water immiscible organic solvent solution of an extraction reagent formulation to extract at least a portion of the copper values into the organic phase;

(b) separating the resultant copper pregnant organic phase from the copper barren aqueous phase; and (c) recovering the copper values from the copper pregnant organic phase:

wherein the extraction reagent formulation comprises an hydroxy aryl oxime and an equilibrium modifier in which the modifier is a linear diester or polyester of a dicarboxylic acid and an alcohol, or diol.

The copper values are preferably recovered from the organic phase by (d) contacting the copper pregnant organic phase with an aqueous acidic stripping solution, whereby copper values are stripped from the organic phase into the aqueous acidic stripping solution;

(e) separating said aqueous acidic stripping solution from said organic phase; and (f) recovering the copper from said aqueous acidic stripping preferably by electrowinning;

The extractant reagents for use in the extraction of copper step include those containing one or more hydroxyaryl oxime extractants of the hydroxy aryl aldoxime or hydroxy aryl ketone oxime type. A general formula for such oximes is formula (I) below;

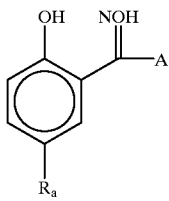

in which A may be:
(i)

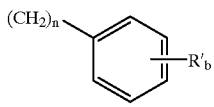

(ii) R''' or
(iii) H where R and R' may be individually alike or different and are saturated aliphatic groups of 1–25 carbon atoms, ethylenically unsaturated aliphatic groups of 3–25 carbon atoms or OR'' where R'' is a saturated or ethylenically unsaturated aliphatic group as defined; n is 0 or 1; a and b are each 0, 1, 2, 3, 4, with the proviso that both are not 0 and the total number of carbon atoms in $R_a$ and $R'_b$ is from 3 to 25, R''' is a saturated aliphatic group of 1–25 carbon atoms or an ethylenically unsaturated aliphatic group of 3 to 25 carbon atoms, with the proviso that the total number of carbon atoms in $R_a$ and R''' is from 3–25.

Preferred compounds where A is (i) above are those in which a is 1, b is 0, R is a straight or branched chain alkyl group having from 7 to 12 carbon atoms and where R is attached in a position para to the hydroxyl group. Among those, the more preferred compounds are those wherein R''' is methyl and R and a are as designated. Compounds wherein n has a value of 0 (i.e. hydroxybenzophenone oxime compounds) may suitably be prepared according to methods disclosed in Swanson, U.S. Pat. Nos. 3,952,775 and 3,428,449. By reason of ready solubility in organic diluents commonly employed in solvent extraction and desirable properties of complexes of the compounds with copper, preferred benzophenone compounds are those having a single alkyl group of 7–12 carbon atoms in a position para to the hydroxy group, in which the alkyl group is a mixture of isomers. Examples of such compounds are 2-hydroxy-5-nonylbenzophenone oxime and 2-hydroxy-5-dodecyl benzophenone oxime, which are obtained as mixtures of the isomeric forms when commercial nonylphenol and dodecylphenol are respectively employed in their synthesis.

Compounds wherein n has a value of 1 (i.e. hydroxy phenyl benzyl ketone oxime compounds) may suitably be prepared according to methods described in Anderson U.S. Pat. No. 4,029,704. Preferred phenyl benzyl ketone oximes like the above noted benzophenone oximes are those having an isomeric mixture of 7 to 12 carbon alkyl groups as a single substituent on the ring para to the hydroxyl group. These preferred compounds are exemplified by the compound, 2-hydroxy-5-nonylphenyl benzyl ketone oxime, as manufactured from a commercial nonylphenol comprising a mixture of nonyl isomeric forms.

Compounds of the hydroxy phenyl alkyl ketone oxime type may suitably be prepared according to the procedures disclosed in UK Patent 1,322,532. As noted with regard to the benzophenone and phenyl benzyl ketone compounds noted above, the preferred compounds of this type are also those having an isomeric mixture of 7 to 12 carbon alkyl groups as a single substituent on the ring para to the hydroxyl group. Also preferred are those in which the R''' alkyl group is methyl. Consequently, illustrative of such preferred compounds is 2-hydroxy-5-nonyl phenyl methyl ketone oxime manufactured through the use of commercial nonylphenol.

Hydroxy aryl aldoxime extractants which are employed are those in which A is H. These hydroxy benzaldoximes, also called "salicylaldoximes"), may suitably be prepared according to methods described in Ackerley et al U.S. Pat. Nos. 4,020,105 or 4,020,106 or by oximation of aldehydes prepared according to Beswick U.S. Pat. No. 4,085,146. Again preferred compounds are those having an isomeric mixture of isomeric 7 to 12 carbon alkyl groups as a single substituent para to the hydroxyl group mixed alkyl isomeric forms of 2-hydroxy-5-heptyl benzaldoxime, 2-hydroxy-5-octyl benzaldoxime, 2-hydroxy-5-nonyl benzaldoxime and 2-hydroxy-5-dodecyl benzaldoxime are preferred, the most preferred for the purposes of the present invention where A is H, being the nonyl and dodecyl compounds.

Reagents may include a single extractant chemical as illustrated above or may comprise mixtures of different aldoxime or ketoxime extractants of the type illustrated in U.S. Pat. Nos. 4,507,268; 4,544,532 and 4,582,689. One particularly useful oxime in admixture with another oxime is an acetophenone oxime such as 5-alkyl 2-hydroxy acetophenone oxime, in which the alkyl group contains from about 6 to about 12 carbon atoms, such as 5-nonyl-2-hydroxy acetophenone oxime or 5-dodecyl-2-hydroxy acetophenone oxime. Reagents also useful in the practice of the invention may include kinetic additives. Preferred kinetic additives include alpha-hydroxy oximes described in Swanson U. S. Pat. No. 3,224,873 and alpha-beta-dioximes described in Koenders et al, U.S. Pat. No. 4,173,616. Kinetic additives are frequently referred to as "accelerators", "catalysts", "kinetic catalysts" or "kinetic synergists" and are generally defined as chemical substances increasing the rate of transfer of metal values between the organic and aqueous phases without materially affecting the position of equilibrium.

As indicated earlier, the oxime reagent which is water insoluble, is dissolved in a water-immiscible liquid hydrocarbon solvent and the resulting organic solution is contacted with the copper containing aqueous phase to extract at least a portion of the copper values into the organic phase. The phases are then separated and the copper values are stripped from the loaded organic (LO) phase by use of an aqueous stripping medium. Prior to stripping, it is not unusual to wash the organic phase, particularly when trace metals may be loaded on the organic extractant. One or more wash stages may accordingly be employed depending on any trace metals present, the amount of entrainment and the required purity of the final nickel loaded stripping solution.

In the process of extraction a wide variety of water immiscible liquid hydrocarbon solvents can be used in the copper recovery process to form the organic phase in which the extractant is dissolved. These include aliphatic and aromatic hydrocarbons such as kerosenes, benzene, toluene, xylene and the like. A choice of essentially water-immiscible hydrocarbon solvents or mixtures thereof will depend on factors, including the plant design of the solvent extraction plant, (mixer-settler units, extractors) and the like. The preferred solvents for use in the present invention are the aliphatic or aromatic hydrocarbons having flash points of 130 degrees Fahrenheit and higher, preferably at least 150 degrees and solubilities in water of less than 0.1% by weight. The solvents are essentially chemically inert. Representative commercially available solvents are Orfom® SX7, petroleum distillate available from Phillips Petroleum Company, having a flash point of 160 degrees Fahrenheit; Escaid™ 100 and 110 (available from Exxon-Europe) having a flash point of 180 degrees Fahrenheit; Norpar™ 12 (available from Exxon-USA) with a flash point of 160 degrees Fahrenheit; Conoc™ 120E (available from Conoco) with a flash point of 180 degrees Fahrenheit; and Aromatic 150 (an aromatic kerosene available from Exxon-USA having a flash point of 150 degrees Fahrenheit), and other various kerosenes and petroleum fractions available from other oil companies.

In the process, the volume ratios of organic to aqueous (O:A) phase will vary widely since the contacting of any quantity of the oxime organic solution with the copper containing aqueous solution will result in the exaction of copper values into the organic phase. For commercial practicality however, the organic:aqueous phase ratios for extraction are preferably in the range of about 50:1 to 1:50. It is desirable to maintain an effective O:A ratio of about 1:1 in the mixer unit by recycle of one of the streams. In the stripping step, the organic:aqueous stripping medium phase will preferably be in the range of about 1:4 to 20:1. For practical purposes, the extracting and stripping are normally conducted at ambient temperatures and pressure although higher and lower temperatures and pressures are entirely operable. While the entire operation can be carried out as a batch operation, most advantageously the process is carried out continuously employing one or more extraction (E) stages followed by one or more stripping (S) stages with the various streams or solutions being recycled to the various operations in the process for recovery of the copper extraction and the stripping steps.

In the extraction process, the organic solvent solutions may contain the oxime extractant typically in an amount of about 5–25% by weight, generally on a Volume/Volume percentage (V/V %) with respect to the solvent of about 5–40%, typically about 10–20 V/V %.

The extraction reagent formulation will accordingly contain an aldoxime, a ketoxime or a combination of such oximes, a diester and/or a polyester as described herein below in an aliphatic hydrocarbon solvent. Typically the extraction reagent will be comprised of an aldoxime, a ketoxime or a combination of such oximes in relative amounts ranging from about 1/100 to about 100/1 at a concentration of aldoxime from about 1.00 mole/liter to about 1.50 mole/liter and a concentration of ketoxime ranging from about 0.25 mole/liter to about 0.75 mole/liter and from about 0.3 to about 0.75 mole/liter of a diester. In the case of the polyester it will be employed in an amount sufficient to provide a degree of modification equivalent to the diester as set out above. Preferably, a formulated extractant will be comprised of 1.25 moles/liter of 5-Nonylsalicylaldoxime, about 0.51 moles/liter of 5-nonyl-2-hydroxyacetophenone oxime, 0.3 to 0.75 moles/liter of an ester as described in Example 2 below in SHELLSOL® D70 solvent.

The diesters according to the invention are those resulting from the esterification of an unbranched dicarboxylic acid and an unbranched monool. Unbranched polyesters can also be used in the process according to the invention. Such polyesters can be made by the reaction of an unbranched dicarboxylic acid and an unbranched diol. The unbranched dicarboxylic acid can be a saturated or unsaturated aliphatic dicarboxylic acid or it can be an aromatic dicarboxylic acid. Examples of unbranched aliphatic and aromatic dicarboxylic acids according to the invention include, but are not limited to, oxalic, malonic, succinic, glutaric, adipic, maleic, fumaric, phthalic, terephthalic and isophthalic acids respectively. One commercially available mixture of dicarboxylic acids is a mixture containing about 5–31% succinic acid, 11–65% glutaric and 4–25% adipic. Examples of linear monools include, but are not limited to, ethanol, n-propanol, n-butanol, n-hexanol, n-octanol, n-decanol, cyclohexanol and cyclopentanol. Examples of linear diols include, but are not limited to, ethylene glycol, 1,3-propanediol, 1,4-butanediol, 1,6-hexanediol. Particularly preferred is the di-n-butyl, di-n-pentyl or di-n-hexyl or di-n-octyl ester of adipic acid or the mixture noted above.

Esters made by esterification of diols as set forth above and mono-carboxylic acids are also contemplated, Examples of linear mono-carboxylic acids include, but are not limited to, butanoic acid, pentanoic acid, hexanoic acid, decanoic acid, octanoic acid. One can use the esters according to the invention either individually or as mixtures with one another. One preferred mixture is the result of esterifying a mixture of these diacids that is commercially available as a by-product from nylon manufacture. This mixture of diacids, as noted earlier above, typically consists of about 5–31% succinic acid, 11–65% glutaric acid, and 4–25% adipic acid. An example describing a typical preparation of a diester is found below. These diesters can be used as equilibrium modifiers in mixtures with strong copper extractants such as the alkylsalicylaldoximes to give mixtures having degrees of modification ranging from 0.2–0.95 with the preferred degree of modification range being 0.4–0.9. They can also be used as equilibrium modifiers in mixture with strong copper extractants such as alkylsalicylaldoximes and a hydroxy aryl ketoxime such as 5-nonyl-2-hydroxyacetophenone oxime where the mole ratio of alkylsalicylaldoxime and the hydroxy aryl ketoxime ranges from 1/100 to 100/1 with the most preferred range being from 4/1 to 1/4. In mixtures with the alkylsalicylaldoxime and the alkyl aryl ketoxime, the diester would be present in sufficient quantity to give a degree of modification of the alkylsalicylaldoxime component of 0.2 to 0.95.

As employed herein, "degree of modification" designates the inverse ratio of (a) the stripped solvent copper level of an hydroxy aryl aldoxime extractant at equilibrium (expressed in terms of grams per liter of copper) extracted with an aqueous solution containing a fixed concentration of copper and sulfuric acid to (b) the stripped solvent copper level of the same extractant under the same conditions when a selected equilibrium modifier additive is present. Consistent with this definition, the presence of relatively small quantities of an equilibrium modifier will shift the extraction equilibrium slightly, resulting in minor diminution of aldoxime stripped solvent copper level at equilibrium, as will be reflected by a degree of modification value closely approaching 1.0, e.g., 0.99. Increased effective quantities of modifier under otherwise identical conditions will result in a more pronounced shift in extraction equilibrium and a more pronounced diminution of aldoxime stripped solvent copper level at equilibrium, as will be reflected by a degree of modification corresponding less than 1.0.

Another variation of an oxime would involve substitution of the 5-nonyl-2-hydroxyacetophenone oxime component of the mixture with an improved product derived from a modified manufacturing process which comprises heating at least one phenol ester containing an unreacted phenol in an inert liquid organic solvent with a Lewis acid and a monocarboxylic acid halide or anhydride to obtain a ketone by the Fries Rearrangement; (B) isolating the ketone reaction product from the reaction mixture; and (C) reacting hydroxylamine or a salt thereof with the ketone obtained in step (B) to produce a ketoxime from the ketone.

The invention can be further illustrated by means of the following examples, in which all parts and percentages are by weight unless otherwise indicated. Earlier "degree of modification" has been referred to. "Degree of Modification" is further defined as the inverse ratio of (a) the stripped solvent copper concentration of an aldoxime extractant at equilibrium (g/l Cu) extracted from an aqueous solution containing 30 g/l Cu 150 g/l $H_2SO_4$ to (b) the stripped solvent copper concentration of the same extractant under the same conditions when the selected equilibrium modifier is present.

The following example of the present invention establishes that the use of the linear diesters results in performance at least equivalent to that of the highly branched diester, 2,2,4-trimethylpentane-1,3-diol diisobutyrate (TXIB).

EXAMPLE 1

A series of solvent extraction circuit comparisons were carried out at a mine site located in the Southwestern United States. These comparisons were carried out in a side-by side fashion in two circuits consisting of one parallel stage of extraction, two stages of extraction in series, and one stage of stripping with a loaded organic surge tank. In this configuration, the stripped organic contacts fresh aqueous feed solution in the parallel stage to generate a partially loaded organic plus a parallel stage raffinate. The partially loaded organic then enters extraction stage E2 where it contacts the partially copper depleted aqueous raffinate from extraction stage E1. The aqueous raffinate from E2 exits the system as final raffinate. The partially loaded organic carrying additional copper exits E2 and enters E1 where it contacts fresh aqueous feed solution. The resultant loaded organic phase then proceeds to the loaded organic surge tank from whence it is then pumped to the strip stage where it contacts lean electrolyte to give stripped organic and pregnant electrolyte which then returns to the tankhouse. The circuits were adjusted as closely as possible to give identical performance. The aqueous feed solution contained 2.3 gpl of copper and 5.6 gpl of iron. The lean electrolyte contained typically 210–220 gpl of sulfuric acid and 33–35 gpl of copper.

The organic phases consisted of the following components as outlined in Table 1 diluted up to give 35 liters of total organic with Conoco 170 Exempt Solvent.

TABLE 1

| Organic Phase | Aldoxime[1] | Ketoxime[2] | E 4207[3] | TXIB |
|---|---|---|---|---|
| A | 2674 g | 891.3 g | 1040 g | 0.0 |
| B | 2920 g | 0.0 | 1966 g | 0.0 |
| C | 2920 g | 0.0 | 0.0 | 1871.1 g |

1) 5-Nonylsalicylaldoxime.
2) 5-nonyl-2-hydroxyacetophenone oxime.
3) Diester derived from esterification of a mixture comprised of 5–31% succinic acid, 11–65% glutaric acid, and 4–25% adipic acid with a mixture of n-hexanol and n-octanol.

Aqueous in organic entrainment measurements were made during the course of a comparison run using the methodology described in Henkel Red Line Bulletin— "Aqueous Entrainment in Organic Solutions—Centrifuge Method". Samples of the organic were collected at the overflow weir of E1. The results of a comparison of aqueous entrainment values in the loaded organic exiting E1are summarized in Table 2.

As the data in Table 2 shows, the linear diester based formulations give better performance in terms of entrainment as compared to the highly branched diester, TXIB.

TABLE 2

| Comparison | Organic Phase | Aq. Entrainment (ppm) |
|---|---|---|
| 1 | C | 1125 |
|   | A | 875 |
| 2 | B | 617 |
|   | C | 918 |

EXAMPLE 2

Preparation of Di-n-pentyl Dicarboxylate
Method A (p-toluenesulfonic acid):

A 5-l, 4 neck round bottomed flask equipped with mechanical stirring, a thermometer, a Dean-Stark trap, and a condenser was charged with Dibasic Acid (DBA, Dupont) (1426.5 g, 5.296 mol) and n-pentyl alcohol (1403.3 g, 15.92 mol). Water (550 mL) was removed from the reaction mixture. After cooling to ambient temperature, p-toluenesulfonic acid (50 g, 0.26 mol, 5 mol %) was added. The resulting reaction mixture was heated for 8 h while 908 mL of water (908 mL) was removed. The cooled reaction mixture was transferred to a 4L separatory funnel and washed with 1 L water and 4×1L brine until the pH was neutral. The organic phase was then washed with 1L 0.0938N NaOH followed by 4×1L brine until the pH was neutral. Crude product was transferred to a 3L RBF for distillation, and distilled in vacuo to obtain di-n-pentyl dicarboxylate in 94.8% yield.

Method B (stannous oxalate):

DBA (132 g) was added to a 250 ml round bottomed flask and evaporated the water present in DBA until the weight of the DBA solution was 87.63 g. Amyl alcohol (105.6 g, 1.2 mol) was used to transfer the warm DBA solution to a 500 ml 4 neck round bottomed flask equipped with mechanical stirring, a thermometer, a Dean-Stark trap, and a condenser. A 1.0 g sample of the DBA/amyl alcohol mixture was titrated with 5.1 ml of 1N NaOH (acid value=286). Tin(II) oxalate (1 15 mg, 0.06%) was added to the mixture, and the resulting mixture heated under vigorous stirring. The esterification was continued until the theoretical amount of water (41.5 g H20) was collected in the trap. The reaction mixture was cooled, and then treated with 50% NaOH solution (570 mg) to neutralize any remaining acid species. Crude product was distilled in vacuo (150–155° C. (0.6–1.6 torr) to obtain di-n-pentyl dicarboxylate in 90.7% yield.

What is claimed is:

1. A process for extracting and recovering copper from an aqueous solution containing copper values comprising:
    (a) contacting the aqueous copper bearing solution with an organic phase comprising a water insoluble and water immiscible solvent solution of an extraction reagent formulation to extract at least a portion of the copper values into the organic phase;
    (b) separating the resultant copper pregnant organic phase from the copper barren aqueous phase; and
    (c) recovering the copper values from the copper pregnant organic phase; wherein the extraction reagent formulation comprises an (i) oxime extractant and (ii) an equilbrium modifier in which the modifier is a linear diester or polyester of an unbranched monocarboxylic acid or unbranched dicarboxylic acid and an unbranched alcohol.

2. A process as defined in claim 1 wherein the recovery of copper values in step (c) comprises:
    (d) contacting the copper pregnant organic phase of step (b) with an aqueous acidic stripping solution whereby copper values are stripped from the organic phase into the aqueous acidic stripping solution;
    (e) separating the aqueous stripping solution containing the copper values from the organic phase; and
    (f) recovering the copper from the aqueous acidic stripping solution.

3. A process as defined in claim 2 wherein the copper is recovered from the aqueous acidic stripping solution by electrowinning.

4. A process as defined in claim 1 wherein the extractant is an hydroxy aryl oxime.

5. A process as defined in claim 4, wherein the hydroxy aryl oxime is a ketoxime.

6. A process as defined in claim 4, wherein the hydroxy aryl oxime is an aldoxime.

7. A process as defined in claim 4, in which the hydroxy aryl oxime has the formula:

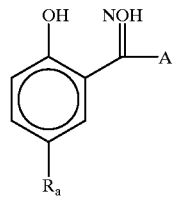

in which A is selected from the group
    (i)

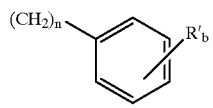

(ii) R''' and
    (iii) H
where R and R' may be individually alike or different and are saturated aliphatic groups of 1–25 carbon atoms, ethyleni- cally unsaturated aliphatic groups of 3–25 carbon atoms or OR" where R" is a saturated or ethylenically unsaturated aliphatic group as defined; n is 0 or 1; a and b are each 0, 1, 2, 3, or 4 with the proviso that both are not 0 and the total number of carbon atoms in $R_a$ and $R'_b$ is from 3–25, R''' is a saturated aliphatic group of 1–25 carbon atoms or an ethylenically unsaturated aliphatic group of 3–25 carbon atoms with the proviso that the total number of carbon atoms in $R_a$ and R''' is from 3–25.

8. A process as defined in claim 7, wherein the hydroxy aryl oxime is a ketoxime selected from the group consisting of 2-hydroxy-5-alkyl benzophenone oxime in which the alkyl group contains from 7 to 12 carbon atoms and 2-hydroxy-5-nonyl acetophenone oxime.

9. A process as defined in claim 7, in which the hydroxy aryl oxime is an alkyl salicylaldoxime in which the alkyl group contains from 7 to 12 carbon atoms.

10. A process as defined in claim 6, wherein the hydroxyaryl oxime is a salicylaldoxime selected from the group consisting of 5-nonylsalicylaldoxime and 5-dodecylsalicylaldoxime.

11. A process as defined in claim 4, wherein the water immiscible solvent is selected from the group consisting of kerosene, benzene, toluene and xylene.

12. A process as defined in claim 1 wherein the unbranched dicarboxylic acid contains up to about 12 carbon atoms and is selected from the group consisting of an aromatic dicarboxylic acid and a saturated or unsaturated aliphatic dicarboxylic acid and the unbranched alcohol is selected from the group consisting of a linear mono-ol and a linear diol containing up to about 12 carbon atoms.

13. A process as defined in claim 12 wherein the unbranched monocarboxylic acid contains up to 12 carbon atoms and the unbranched linear diol contains up to about 12 carbon atoms.

14. A process as defined in claim 13 wherein the unbranched linear diol is selected from the group consisting of ethylene glycol, 1,3-propane diol, 1,4-butane diol and 1,6-hexane diol.

15. A process as defined in claim 12 wherein the unbranched dicarboxylic acid is selected from the group consisting of oxalic, malonic, succinic, glutaric, adipic, maleic,fumaric, phthalic, terephthalic and isophthalic acids.

16. A process as defined in claim 12 in which said unbranched mono-ol is selected from the group consisting of ethanol, n-propanol, n-butanol, n-hexanol, n-octanol, n-decanol, cyclohexanol, and cyclopentanol and said unbranched linear diol is selected from the group consisting of ethylene glycol, 1,3-propanediol, 1,4-butanediol, and 1,6-hexanediol.

17. A process as defined in claim 15 wherein the dicarboxylic acid is a mixture of succinic, glutaric, and adipic acid and the unbranched alcohol is n-hexanol.

18. A process as defined in claim 1 in which said equilibrium modifier is di-n-butyl adipate.

19. A process as defined in claim 1 in which said equilibrium modifier is di-n-hexyl adipate.

20. A process as defined in claim 1 in which the equilibrium modifier is di-n-pentyl adipate.

21. An extraction reagent composition comprised of an oxime extractant and equilibrium modifier of an unbranched linear diester or polyester of an unbranched monocarboxylic acid or unbranched dicarboxylic acid and an unbranched alcohol.

22. An extraction reagent composition as defined in claim 21 wherein the oxime extractant has the formula

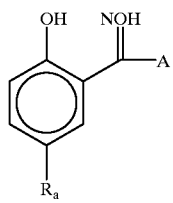

in which A is selected from the group
(i)

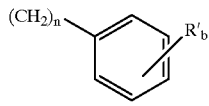

(ii) R''' and
(iii) H where R and R' may be individually alike or different and are saturated aliphatic groups of 1–25 carbon atoms, ethylenically unsaturated aliphatic groups of 3–25 carbon atoms or OR'' where R'' is a saturated or ethylenically unsaturated aliphatic group as defined; n is 0 or 1; a and b are each 0, 1, 2, 3, or 4 with the proviso that both are not 0 and the total number of carbon atoms in $R_a$ and $R'_b$ is from 3–25, R''' is a saturated aliphatic group of 1–25 carbon atoms or an ethylenically unsaturated aliphatic group of 3–25 carbon atoms with the proviso that the total number of carbon atoms in $R_a$ and R''' is from 3–25.

23. An extraction reagent composition as defined in claim 21 wherein the unbranched dicarboxylic acid contains up to about 12 carbon atoms and is selected from the group consisting of an aromatic dicarboxylic acid and a saturated or unsaturated aliphatic dicarboxylic acid and the unbranched alcohol is selected from the group consisting of a linear mono-ol and a linear diol containing up to about 12 carbon atoms.

24. An extraction reagent composition as defined in claim 21 wherein the unbranched dicarboxylic acid is selected from the group consisting of oxalic, malonic, succinic, glutaric, adipic, maleic, fumaric, phthalic, terephthalic and isophthalic acids.

25. An extraction reagent composition as defined in claim 21 wherein said unbranched alcohol is selected from the group consisting of ethanol, n-propanol, n-butanol, n-hexanol, n-octanol, n-decanol, cyclohexanol, and cyclopentanol ethylene glycol, 1,3-propanediol, 1,4-butanediol, and 1,6-hexanediol.

26. An extraction reagent composition as defined in claim 21 wherein the dicarboxylic acid is a mixture of succinic, glutaric, adipic acid and the uhbranched linear alcohol is n-hexanol.

27. An extraction reagent composition as defined in claim 21 wherein the equilibrium modifier is di-n-butyl adipate.

28. An extraction reagent composition as defined in claim 21 wherein the equilibrium modifier is di-n-pentyl adipate.

29. An extraction reagent composition as defined in claim 21 wherein the equilibrium modifier is di-n-hexyl adipate.

30. An extraction reagent composition as defined in claim 21 wherein the unbranched monocarboxylic acid contains up to about 12 carbon atoms and the unbranched alcohol contains up to about 12 carbon atoms.

31. An extraction reagent composition as defined in claim 29 wherein the unbranched alcohol is selected from the group consisting of ethylene glycol, 1,3-propane diol, 1,4-butane diol and 1,6-hexane diol.

* * * * *